US011427702B2

(12) United States Patent
Thomasson et al.

(10) Patent No.: US 11,427,702 B2
(45) Date of Patent: Aug. 30, 2022

(54) RUBBER COMPOSITION COMPRISING A SPECIFIC CRUMB RUBBER

(71) Applicant: COMPAGNIE GENERALE DES ETABLISSEMENTS MICHELIN, Clermont-Ferrand (FR)

(72) Inventors: Damien Thomasson, Clermont-Ferrand (FR); Olivia Cuscito, Clermont-Ferrand (FR)

(73) Assignee: COMPAGNIE GENERALES DES ETABLISSEMENTS MICHELIN, Clermont-Ferrand (FR)

( * ) Notice: Subject to any disclaimer, the term of this patent is extended or adjusted under 35 U.S.C. 154(b) by 261 days.

(21) Appl. No.: 16/471,601

(22) PCT Filed: Dec. 19, 2017

(86) PCT No.: PCT/FR2017/053695
§ 371 (c)(1),
(2) Date: Jun. 20, 2019

(87) PCT Pub. No.: WO2018/115716
PCT Pub. Date: Jun. 28, 2018

(65) Prior Publication Data
US 2021/0130592 A1 May 6, 2021

(30) Foreign Application Priority Data
Dec. 20, 2016 (FR) ...................................... 1662874

(51) Int. Cl.
*C08L 19/00* (2006.01)
*B60C 1/00* (2006.01)
*B60C 11/00* (2006.01)
*C08L 7/00* (2006.01)
*C08L 9/00* (2006.01)

(52) U.S. Cl.
CPC .......... *C08L 19/003* (2013.01); *B60C 1/0016* (2013.01); *B60C 11/0008* (2013.01); *C08L 7/00* (2013.01); *C08L 9/00* (2013.01); *B60C 2011/0016* (2013.01)

(58) Field of Classification Search
CPC .............................. C08L 19/003; B60C 1/0016
See application file for complete search history.

(56) References Cited

U.S. PATENT DOCUMENTS

| 4,161,464 A | 7/1979 | Nicholas |
| 5,227,425 A | 7/1993 | Rauline |
| 5,602,186 A | 2/1997 | Myers et al. |
| 5,798,394 A | 8/1998 | Myers et al. |
| 5,852,099 A | 12/1998 | Vanel |
| 5,900,449 A | 5/1999 | Custodero et al. |
| 6,420,488 B1 | 7/2002 | Penot |
| 6,433,064 B1 | 8/2002 | Gorl et al. |
| 6,536,492 B2 | 3/2003 | Vasseur |
| 7,250,463 B2 | 7/2007 | Durel et al. |
| 7,335,692 B2 | 2/2008 | Vasseur et al. |
| 7,344,777 B2 | 3/2008 | Kino et al. |
| 7,445,170 B2 | 11/2008 | Cialone et al. |
| 7,820,771 B2 | 10/2010 | Lapra et al. |
| 7,861,958 B2 | 1/2011 | Waznys et al. |
| 8,461,269 B2 | 6/2013 | Varagniat et al. |
| 8,883,929 B2 | 11/2014 | Gandon-Pain et al. |
| 9,815,974 B2 | 11/2017 | Jasiunas et al. |
| 2001/0034389 A1 | 10/2001 | Vasseur |
| 2004/0127617 A1 | 7/2004 | Vasseur et al. |
| 2005/0004297 A1 | 1/2005 | Durel et al. |
| 2005/0037199 A1 | 2/2005 | Kino et al. |
| 2007/0060711 A1 | 3/2007 | Perera et al. |
| 2008/0132644 A1 | 6/2008 | Lapra et al. |
| 2009/0270558 A1 | 10/2009 | Gandon-pain et al. |
| 2010/0022714 A1 | 1/2010 | Varagniat et al. |
| 2011/0021702 A1 | 1/2011 | Gandon-Pain et al. |
| 2011/0039976 A1 | 2/2011 | Vasseur |
| 2011/0172365 A1 | 7/2011 | Meredith et al. |
| 2012/0208948 A1 | 8/2012 | Gandon-Pain et al. |
| 2012/0252910 A1 | 10/2012 | Yen et al. |
| 2012/0316283 A1 | 12/2012 | Rosenmayer et al. |
| 2014/0196828 A1 | 7/2014 | Miyazaki |
| 2014/0228505 A1 | 8/2014 | Papp |
| 2015/0315369 A1 | 11/2015 | Rosenmayer et al. |

(Continued)

FOREIGN PATENT DOCUMENTS

| CN | 103923356 A | 7/2014 |
| EP | 0501227 A1 | 9/1992 |

(Continued)

OTHER PUBLICATIONS

Machine translation of JP 2002-338743 A, published Nov. 27, 2002. (Year: 2002).*
U.S. Appl. No. 16/471,610.
A.J. Gordon et al., "H. Mesh Sizes and Particle Diameter", The Chemist's Companion: A Handbook of Practical Data, Techniques, and References, p. 371 (1972).
Technical Data Sheet, GR. 555 Reclaim/GRP NRF 40R Tyre Reclaim Introduction, XP055395952 (retrieved from URL: http://www.allcocks.co.uk/files/lib/317/GR 555 Reclaim—GRP NRF 40R Tyre Reclaim on Aug. 3, 2017).

(Continued)

*Primary Examiner* — Vickey Nerangis
(74) *Attorney, Agent, or Firm* — Venable LLP

(57) ABSTRACT

A rubber composition is based on at least an elastomer, a reinforcing filler, a crosslinking system and a crumb rubber, the said crumb exhibiting: an acetone extract of between 8% and 50% by weight; a chloroform extract such that the ratio of the chloroform extract to the acetone extract, expressed as percentage by weight, is less than 1.5, the chloroform extract exhibiting a weight-average molecular weight (Mw) of less than 10000 g/mol; and a content of plasticizer of greater than 8% by weight in the composition of the crumb.

20 Claims, No Drawings

(56) References Cited

U.S. PATENT DOCUMENTS

| | | |
|---|---|---|
| 2016/0152805 A1 | 6/2016 | Jasiunas et al. |
| 2016/0200899 A1 | 7/2016 | Forciniti et al. |
| 2016/0208082 A1 | 7/2016 | Jasiunas et al. |
| 2017/0369686 A1 | 12/2017 | Rosenmayer et al. |
| 2019/0382563 A1 | 12/2019 | Thomasson et al. |
| 2019/0382564 A1 | 12/2019 | Thomasson et al. |
| 2020/0095401 A1 | 3/2020 | Thomasson et al. |
| 2020/0101793 A1 | 4/2020 | Tregouet et al. |

FOREIGN PATENT DOCUMENTS

| | | |
|---|---|---|
| EP | 0735088 A1 | 10/1996 |
| EP | 0810258 A1 | 12/1997 |
| EP | 1 454 942 A1 | 9/2004 |
| EP | 3045323 A1 | 7/2016 |
| EP | 3045492 A1 | 7/2016 |
| FR | 2 999 579 B1 | 5/2016 |
| JP | 6-256575 A | 9/1994 |
| JP | 2002-284928 A | 10/2002 |
| JP | 2002-338743 A | 11/2002 |
| JP | 2007-63507 A | 3/2007 |
| JP | 2009-35603 A | 2/2009 |
| JP | 2010-013494 A | 1/2010 |
| JP | 2010-13494 A | 1/2010 |
| JP | 2011-148893 A | 8/2011 |
| JP | 2012-62429 A | 3/2012 |
| KR | 20140066293 A | 6/2014 |
| WO | 97/15614 A1 | 5/1997 |
| WO | 97/36724 A2 | 10/1997 |
| WO | 99/16600 A1 | 4/1999 |
| WO | 00/05300 A1 | 2/2000 |
| WO | 00/05301 A1 | 2/2000 |
| WO | 02/088238 A1 | 11/2002 |
| WO | 03/016387 A1 | 2/2003 |
| WO | 2006/069792 A1 | 7/2006 |
| WO | 2006/069793 A1 | 7/2006 |
| WO | 2008/003434 A1 | 1/2008 |
| WO | 2008/003435 A1 | 1/2008 |
| WO | 2009/083160 A1 | 7/2009 |
| WO | 2009/137585 A2 | 11/2009 |
| WO | WO-2013040425 A1 * | 3/2013 ............ C08K 5/548 |
| WO | 2016105932 A1 | 6/2016 |

OTHER PUBLICATIONS

International Search Report dated Mar. 29, 2018, in corresponding PCT/FR2017/053695 (6 pages).
Mesh to Micron Conversion Table, Ecologix (2018).

* cited by examiner

RUBBER COMPOSITION COMPRISING A SPECIFIC CRUMB RUBBER

BACKGROUND

The invention relates to compositions, in particular for tyres, and more especially to compositions comprising a crumb rubber.

This is because it is advantageous today for tyre manufacturers to find solutions for lowering the costs of rubber compositions without penalizing the performance qualities of the tyres using these compositions.

It is known in the state of the art that crumb rubbers can be used in tyres. For example, the document US 2014/0228505 describes the use of a crumb rubber with a size of less than 60 mesh (250 μm) in compositions for tyres.

The Applicant Companies have now shown that the distinctive composition of the crumbs used has an impact on the properties of the compositions comprising these crumb rubbers. In particular, the Applicant Companies have found a means of obtaining excellent melt flow index and tear strength properties in compositions comprising specific crumbs.

SUMMARY

The invention thus relates to a rubber composition based on at least an elastomer, a reinforcing filler, a crosslinking system and a crumb rubber, the said crumb exhibiting:
  an acetone extract of between 8% and 50% by weight;
  a chloroform extract such that the ratio of the chloroform extract to the acetone extract, expressed as percentage by weight, is less than 1.5, the chloroform extract exhibiting a weight-average molecular weight (Mw) of less than 10000 g/mol;
  and a content of plasticizer of greater than 8% by weight in the composition of the crumb.

The invention also relates to a tyre comprising a composition as defined above, preferably in all or part of its tread.

Preferably, the tyre according to the invention will be chosen from the tyres intended to equip a two-wheel vehicle, a passenger vehicle, or also a "heavy-duty" vehicle (that is to say, underground, bus, off-road vehicles, heavy road transport vehicles, such as lorries, tractors or trailers), or also aircraft, construction equipment, heavy agricultural vehicles or handling vehicles.

DETAILED DESCRIPTION

I—CONSTITUENTS OF THE COMPOSITION

The rubber compositions according to the invention are based on at least an elastomer, a reinforcing filler, a crosslinking system and a crumb rubber, the said crumb exhibiting an acetone extract of between 8% and 50% by weight; a chloroform extract such that the ratio of the chloroform extract to the acetone extract, expressed as percentage by weight, is less than 1.5, the chloroform extract exhibiting a weight-average molecular weight (Mw) of less than 10000 g/mol; and a content of plasticizer of greater than 8% by weight in the composition of the crumb.

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention can be different in the non-crosslinked state and in the crosslinked state.

Furthermore, the term "phr", which is well known to a person skilled in the art, means, within the meaning of the present patent application, part by weight per hundred parts of elastomers, within the meaning of the preparation of the composition before curing, that is to say, in the case of the presence of a crumb rubber in a composition, that the term "phr" means part by weight per hundred parts of "new" elastomers, thus excluding from the base 100 the elastomers contained in the crumb rubber. Of course, the crumb itself exhibits a rubber composition, the ingredients of which can also be expressed in phr, the term "phr" in this case denoting the amount in parts by weight per hundred parts of elastomers, within the meaning of the distinctive composition of the crumb.

In the present description, unless expressly indicated otherwise, all the percentages (%) shown are percentages by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

When reference is made to a "predominant" compound, this is understood to mean, within the meaning of the present invention, that this compound is predominant among the compounds of the same type in the composition, that is to say that it is the one which represents the greatest amount by weight among the compounds of the same type and in particular more than 50%, preferably more than 75%. Thus, for example, a predominant polymer is the polymer representing the greatest weight with respect to the total weight of the polymers in the composition. In the same way, a "predominant" filler is the one representing the greatest weight among the fillers of the composition. By way of example, in a system comprising just one polymer, the latter is predominant within the meaning of the present invention and, in a system comprising two polymers, the predominant polymer represents more than half of the weight of the polymers. On the contrary, a "minor" compound is a compound which does not represent the greatest fraction by weight among the compounds of the same type.

Within the meaning of the present invention, when reference is made to a "predominant" unit (or monomer) within one and the same compound (or polymer), this is understood to mean that this unit (or monomer) is predominant among the units (or monomers) forming the compound (or polymer), that is to say that it is the one which represents the greatest fraction by weight among the units (or monomers) forming the compound (or polymer). Thus, for example, a resin predominantly composed of cyclopentadiene units is a resin in which the cyclopentadiene units represent the greatest amount by weight among all the units making up the said resin. In the same way, a resin predominantly composed of units selected from the group consisting of cyclopentadiene, dicyclopentadiene, methylcyclopentadiene and the mixtures of these is a resin in which the sum of the units selected from the group consisting of cyclopentadiene, dicyclopentadiene, methylcyclopentadiene and the mixtures of these represents the greatest number by weight among all the units making up the said resin. In other words, a "predominant" monomer is a monomer which represents the greatest fraction by weight in the polymer. On the contrary, a "minor" monomer is a monomer which does not represent the greatest molar fraction in the polymer.

In the present patent application, when reference is made to a ratio of the amounts of a compound A and of a compound B, or a ratio between the content of a compound A and the content of a compound B, this is always the ratio in the mathematical sense of the amount of compound A to the amount of compound B.

The compounds mentioned in the description can be of fossil or biobased origin. In the latter case, they may partially or completely result from biomass or be obtained from renewable starting materials resulting from biomass. Polymers, plasticizers, fillers, and the like, are concerned in particular.

I-1 Elastomer

The elastomer can be selected from the group consisting of diene elastomers and the mixtures of these.

It is recalled here that elastomer (or "rubber", the two terms being regarded as synonymous) of the "diene" type should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

Diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

Given these definitions, diene elastomer capable of being used in the compositions according to the invention is understood more particularly to mean:

(a) any homopolymer obtained by polymerization of a conjugated diene monomer having from 4 to 12 carbon atoms;

(b) any copolymer obtained by copolymerization of one or more conjugated dienes with one another or with one or more vinylaromatic compounds having from 8 to 20 carbon atoms;

(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d) a copolymer of isobutene and of isoprene (butyl rubber) and also the halogenated versions, in particular chlorinated or brominated versions, of this type of copolymer.

Although it applies to any type of diene elastomer, a person skilled in the art of tyres will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can contain between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. The term "functional group" is preferably understood here to mean a chemical group which interacts with the reinforcing filler of the composition.

Preferably, the elastomer of the composition predominantly comprises an essentially unsaturated diene elastomer. The elastomer of the composition is preferably selected from the group consisting of polybutadienes (abbreviated to BRs), synthetic polyisoprenes (IRs) or natural polyisoprenes (NRs), butadiene copolymers, isoprene copolymers and the mixtures of these elastomers. Such copolymers of butadiene and of isoprene are more preferably respectively butadiene/styrene copolymers (SBRs) and isoprene/styrene copolymers (SIRs).

More preferably, the predominant elastomer is selected from the group consisting of polybutadienes, natural or synthetic polyisoprenes and the mixtures of these elastomers.

I-2 Reinforcing Filler

The composition according to the invention comprises a reinforcing filler. Use may be made of any type of reinforcing filler known for its abilities to reinforce a rubber composition which can be used for the manufacture of tyres, for example an organic filler, such as carbon black, a reinforcing inorganic filler, such as silica or alumina, or also a blend of these two types of filler.

Preferably, the content of reinforcing filler is within a range extending from 5 to 200 phr and preferably from 20 to 160 phr.

For the requirements of the invention, the reinforcing filler is preferably selected from the group consisting of silicas, carbon blacks and the mixtures of these. More preferably, the reinforcing filler is predominantly carbon black, preferably at a content within a range extending from 30 to 90 phr. Preferably again, the reinforcing filler is predominantly silica, preferably at a content within a range extending from 30 to 90 phr.

All carbon blacks, in particular "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of functionalized polyvinyl organic fillers, such as described in Applications WO-A-2006/069792, WO-A-2006/069793, WO-A-2008/003434 and WO-A-2008/003435.

The composition can comprise one type of silica or a blend of several silicas. The silica used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Evonik, the Zeosil 1165MP, 1135MP and 1115MP silicas from Solvay, the Hi-Sil EZ150G silica from PPG, the Zeopol 8715, 8745 and 8755 silicas from Huber, treated precipitated silicas, such as, for example, the silicas "doped" with aluminium described in Application EP-A-0735088, or the silicas with a high specific surface as described in Application WO 03/16387. The silica preferably has a BET specific surface of between 45 and 400 $m^2/g$, more preferably of between 60 and 300 $m^2/g$.

These compositions can optionally also comprise, in addition to the coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, fatty acids, polyethers, primary, secondary or tertiary amines, or hydroxylated or hydrolysable polyorganosiloxanes.

A person skilled in the art will understand that a reinforcing filler of another nature, in particular organic nature, might be used as filler equivalent to the silica described in the present section, provided that this reinforcing filler is covered with a layer of silica or else comprises, at its surface, functional sites, in particular hydroxyl sites, requiring the use of a coupling agent in order to form the connection between the filler and the elastomer.

The physical state under which the reinforcing filler is provided is not important, whether it is in the form of a powder, of microbeads, of granules, of beads or any other appropriate densified form.

I-3 Crosslinking System

In the composition of the invention, use may be made of any type of crosslinking system known to a person skilled in the art for rubber compositions.

The crosslinking system is preferably a vulcanization system, that is to say based on sulfur (or on a sulfur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as are described subsequently.

The sulfur is used at a preferred content of between 0.5 and 10 phr, more preferably of between 0.5 and 5 phr, in particular between 0.5 and 3 phr.

The vulcanization system of the composition according to the invention can also comprise one or more additional accelerators, for example compounds of the family of the thiurams, zinc dithiocarbamate derivatives, sulfenamides, guanidines or thiophosphates. Use may especially be made of any compound capable of acting as accelerator of the vulcanization of diene elastomers in the presence of sulfur, in particular accelerators of the thiazoles type and also their derivatives, accelerators of thiurams type, or zinc dithiocarbamates. These accelerators are more preferably selected from the group consisting of 2-mercaptobenzothiazyl disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and the mixtures of these compounds. Preferably, use is made of a primary accelerator of the sulfenamide type.

I-4 Crumb Rubber

The composition of the invention also comprises a crumb rubber (abbreviated to "crumb" in the remainder of the text).

The crumbs are presented in the form of granules, optionally put into the form of a rubber plaque. Generally, crumb rubbers result from a grinding or from a micronization of cured rubber compositions already used for a first application, for example in tyres; they are a product of the recycling of materials. The crumbs are preferably provided in the form of microparticles.

The term "microparticles" is understood to mean particles which exhibit a size, namely their diameter in the case of spherical particles or their greatest dimension in the case of anisometric particles, of a few tens of or a few hundred microns.

The crumbs are usually composed of a composition based on an elastomer and on a filler. They also usually comprise all the ingredients used in rubber compositions, such as plasticizers, antioxidants, vulcanization additives, and the like.

It is also known that it is possible to measure, in the crumbs, the acetone extract, the chloroform extract and the average molecular weight of the chloroform extract in order to characterize the composition of these crumbs.

The crumbs of use for the invention exhibit an acetone extract of between 8% and 50% by weight; a chloroform extract such that the ratio of the chloroform extract to the acetone extract, expressed as a percentage by weight, is less than 1.5, the chloroform extract exhibiting a weight-average molecular (Mw) of less than 10000 g/mol; and a content of plasticizer of greater than 8% by weight in the composition of the crumb. This is because the Applicant Companies have shown that the presence of such a content of plasticizer in the crumb makes possible improved melt flow index and tear strength properties in the compositions using such rubber crumbs. Preferably, the crumbs exhibit a content of plasticizer of greater than 12% by weight, more preferably of greater than 15% by weight, in the composition of the crumb. More preferably, the content of plasticizer is within a range extending from 15% to 45% by weight.

The crumb preferably comprises, as plasticizer, a plasticizer selected from the group consisting of plasticizing oils, hydrocarbon resins and their mixtures.

It should be remembered that plasticizing oils are liquid at 20° C., referred to as "low Tg", that is to say which, by definition, exhibit a Tg of less than 0° C., preferably of less than −20° C., preferably of less than −40° C.

Any extender oil, whether it is of aromatic or non-aromatic nature, known for its plasticizing properties with regard to diene elastomers can be used. At ambient temperature (20° C.), these oils, which are more or less viscous, are liquids (that is to say, as a reminder, substances which have the ability to eventually assume the shape of their container), in contrast in particular to plasticizing hydrocarbon resins, which are by nature solid at ambient temperature.

Preferably, the plasticizer comprises a plasticizing oil selected from the group consisting of naphthenic oils (low or high viscosity, in particular hydrogenated or not), paraffinic oils, MES (Medium Extracted Solvates) oils, TDAE (Treated Distillate Aromatic Extracts) oils, mineral oils, vegetable oils, ether plasticizers, ester plasticizers, phosphate plasticizers, sulfonate plasticizers and the mixtures of these compounds; and more preferably selected from the group consisting of naphthenic oils, paraffinic oils, MES oils, TDAE oil, vegetable oils and the mixtures of these compounds. For example, mention may be made of those which comprise between 12 and 30 carbon atoms, for example trioctyl phosphate. Mention may in particular be made, as examples of non-aqueous and water-insoluble ester plasticizers, of the compounds selected from the group consisting of trimellitates, pyromellitates, phthalates, 1,2-cyclohexanedicarboxylates, adipates, azelates, sebacates, glycerol triesters and the mixtures of these compounds. Mention may in particular be made, among the above triesters, of glycerol triesters, preferably predominantly composed (for more than 50%, more preferably for more than 80%, by weight) of an unsaturated $C_{18}$ fatty acid, that is to say selected from the group consisting of oleic acid, linoleic acid, linolenic acid and the mixtures of these acids. More preferably, whether it is of synthetic origin or natural origin (case, for example, of sunflower or rapeseed vegetable oils), the fatty acid used is composed, for more than 50% by weight, more preferably still for more than 80% by weight, of oleic acid. Such triesters (trioleates) having a high content of oleic acid are well known; they have been described, for example, in Application WO 02/088238 as plasticizing agents in tyre treads.

It should be remembered that hydrocarbon resins are thermoplastic resins. This resin is a solid at ambient temperature (23° C.), in contrast to a liquid plasticizing compound, such as an oil. Preferably, the thermoplastic plasticizing hydrocarbon resin exhibits at least any one of the following characteristics:
 a Tg of greater than 0° C., preferably of greater than 30° C.;
 a number-average molecular weight (Mn) of between 400 and 2000 g/mol, more preferably between 500 and 1500 g/mol;
 a polydispersity index (PI) of less than 3, more preferably of less than 2 (as a reminder: PI=Mw/Mn, with Mw the weight-average molecular weight).

More preferably, this thermoplastic plasticizing hydrocarbon resin exhibits all of the preferred characteristics above.

The macrostructure (Mw, Mn and PI) of the hydrocarbon resin is determined by size exclusion chromatography (SEC): solvent tetrahydrofuran; temperature 35° C.; concentration 1 g/l; flow rate 1 ml/min; solution filtered through a filter with a porosity of 0.45 µm before injection; Moore calibration with polystyrene standards; set of 3 Waters columns in series (Styragel HR4E, HR1 and HR0.5); detection by differential refractometer (Waters 2410) and its associated operating software (Waters Empower).

The thermoplastic hydrocarbon resins can be aliphatic or aromatic or also of the aliphatic/aromatic type, that is to say based on aliphatic and/or aromatic monomers. They can be natural or synthetic and based or not based on petroleum (if such is the case, they are also known under the name of petroleum resins).

Suitable as aromatic monomers are, for example: styrene, α-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene or any vinylaromatic monomer resulting from a $C_9$ fraction (or more generally from a $C_8$ to $C_{10}$ fraction). Preferably, the vinylaromatic monomer is styrene or a vinylaromatic monomer resulting from a $C_9$ fraction (or more generally from a $C_8$ to $C_{10}$ fraction). Preferably, the vinylaromatic monomer is the minor monomer, expressed as molar fraction, in the copolymer under consideration.

According to a particularly preferred embodiment, the plasticizing hydrocarbon resin is selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ fraction homopolymer or copolymer resins, $C_9$ fraction homopolymer or copolymer resins, α-methylstyrene homopolymer or copolymer resins and the mixtures of these resins, which can be used alone or in combination with a liquid plasticizer, for example an MES or TDAE oil. The term "terpene" groups together here, in a known way, α-pinene, β-pinene and limonene monomers; use is preferably made of a limonene monomer, a compound which exists, in a known way, in the form of three possible isomers: L-limonene (laevorotatory enantiomer), D-limonene (dextrorotatory enantiomer) or else dipentene, a racemate of the dextrorotatory and laevorotatory enantiomers. Mention will in particular be made, among the above plasticizing hydrocarbon resins, of α-pinene, β-pinene, dipentene or polylimonene homo- or copolymer resins.

The specific crumbs comprising a content of plasticizer of greater than 8% by weight in the composition of the crumb may be available commercially and a person skilled in the art will know how to identify the crumbs of use for the invention, in particular by the analysis of the acetone extracts. According to one possible embodiment, use may be made of the recycling of tyres having a known composition, so as to make sure that the composition of the crumb meets the specific criteria for the invention. The crumb itself, if it is not directly purchased commercially, can be obtained according to the techniques known to a person skilled in the art of grinding or micronization.

Preferably, the crumb of use in the invention comprises a diene elastomer. This elastomer preferably represents at least 30% by weight, more preferably at least 40% by weight, more preferably still at least 50% by weight, of the weight of the crumb, which percentage is determined according to Standard ASTM E1131. It is preferably selected from the group consisting of polybutadienes, polyisoprenes, including natural rubber, butadiene copolymers and isoprene copolymers. More preferably, the molar content of units of diene origin (conjugated dienes) present in the diene elastomer is greater than 50%, preferably between 50% and 70%.

According to a preferred embodiment of the invention, the crumb contains between 5% and 80% by weight of filler, more preferably between 10% and 75% and very preferably between 15% and 70%.

The term "filler" is understood here to mean any type of filler, whether it is reinforcing (typically having nanometric particles, preferably with a weight-average size of less than 500 nm, in particular between 20 and 200 nm) or whether it is non-reinforcing or inert (typically having micrometric particles, preferably with a weight-average size of greater than 1 μm, for example between 2 and 200 μm). The weight-average size of the nanometric particles is measured in a way well known to a person skilled in the art (by way of example, according to Application WO 2009/083160, section 1.1). The weight-average size of the micrometric particles can be determined by mechanical sieving.

Mention will in particular be made, as examples of fillers known as reinforcing by a person skilled in the art, of carbon black or of a reinforcing inorganic filler, such as silica or alumina in the presence of a coupling agent, or their mixtures.

According to a preferred embodiment of the invention, the crumb comprises, by way of filler, a reinforcing filler, in particular a carbon black or a mixture of carbon blacks.

The carbon black or the mixture of carbon blacks preferably represents more than 50%, more preferably more than 80%, more preferably still more than 90%, by weight, of the weight of the reinforcing filler of the crumb. According to a more preferred embodiment, the reinforcing filler consists of a carbon black or of a mixture of carbon blacks.

Very preferably, the carbon black is present in the crumb at a content ranging from 20% to 40% by weight, more preferably from 25% to 35% by weight.

All carbon blacks, in particular blacks of the HAF, ISAF, SAF, FF, FEF, GPF and SRF type, conventionally used in rubber compositions for tyres ("tyre-grade" blacks) are suitable as carbon blacks.

The crumb can contain all the other usual additives which participate in a rubber composition, in particular for a tyre. Mention may be made, among these usual additives, of vulcanization additives, non-reinforcing fillers, such as chalk or kaolin, or protective agents. These additives can be found in the crumb also in the form of residue or of derivative, since they were able to react during the stages of manufacture of the composition or of crosslinking of the composition from which the crumb results.

It is preferable for the crumb rubber to exhibit an average particle size (D50) of between 10 and 400 μm, preferably between 50 and 200 μm.

The grinding can be carried out by various technologies, in particular cryogenic impact micronization technologies, which make it possible to obtain particles of small size on rubber materials. Commercial items of equipment, such as the CUM150 mill from Netzsch or the CW250 mill from Alpine, can be used.

Preferably, the crumb is present at a content within a range extending from 5% to 40% by weight, preferably from 10% to 30% and more preferably from 15% to 25%. In a typical composition intended for the tyre, these contents by weight correspond to contents of 5 to 100 phr. Below 5 phr, the saving made would not be significant enough, whereas, above 100 phr, it is possible for the cohesion properties of the composition to be penalized. Thus, the crumb content is preferably within a range extending from 10 to 90 phr, preferentially from 15 to 90 phr, more preferentially from 20 to 80 phr and very preferentially from 30 to 70 phr, for an optimum functioning of the invention.

The crumbs can be simple ground/micronized rubber materials, without other treatment. It is also known that these crumbs can undergo a treatment in order to modify them. This treatment can consist of a chemical functionalization or devulcanization modification. It can also be a thermomechanical, thermochemical, biological, and the like, treatment.

According to one embodiment of the invention, it is preferable to use a crumb which has not undergone modification by heat and/or mechanical and/or biological and/or chemical treatment.

As regards the constituents of the crumb, it is preferable, for the requirements of the invention, for the crumb to exhibit an acetone extract of between 8% and 30% by weight, preferably between 10% and 30% by weight, preferably between 15% and 25% by weight.

It is also preferable for the crumb to exhibit a chloroform extract of between 10% and 30% by weight, more preferably within a range extending from 15% to 25% by weight.

Preferably, the chloroform extract of the rubber crumb exhibits a weight-average molecular weight (Mw) of less than 8000 g/mol.

Preferably again, the crumb exhibits a mean particle size (D50) of between 10 and 400 μm, preferably between 50 and 200 μm and more preferably between 70 and 200 μm.

I-5 Other Possible Additives

The rubber compositions in accordance with the invention optionally also comprise all or a portion of the usual additives generally used in elastomer compositions intended in particular for the manufacture of treads, such as, for example, pigments, protective agents, such as antiozone waxes, chemical antiozonants or antioxidants, plasticizing agents other than those described above, anti-fatigue agents, reinforcing resins, methylene acceptors (for example phenolic novolak resin) or methylene donors (for example HMT or H3M).

The composition according to the invention can also comprise a plasticizing system. This plasticizing system can be composed of a hydrocarbon resin with a Tg of greater than 20° C., in addition to the specific hydrocarbon resin described above, and/or a plasticizing oil.

Of course, the compositions in accordance with the invention can be used alone or as a blend (i.e., as a mixture) with any other rubber composition which can be used for the manufacture of tyres.

It is obvious that the invention relates to the rubber compositions described above both in the "raw" or non-crosslinked state (i.e., before curing) and in the "cured" or crosslinked, or also vulcanized, state (i.e., after crosslinking or vulcanization).

II—PREPARATION OF THE RUBBER COMPOSITIONS

The compositions are manufactured in appropriate mixers using two successive preparation phases well known to a person skilled in the art: a first phase of thermomechanical working or kneading (sometimes described as "non-productive" phase) at high temperature, up to a maximum temperature of between 110° C. and 200° C., preferably between 130° C. and 180° C., followed by a second phase of mechanical working (sometimes described as "productive" phase) at lower temperature, typically of less than 110° C., for example between 60° C. and 100° C., during which finishing phase the crosslinking or vulcanization system is incorporated; such phases have been described, for example, in Applications EP-A-0 501 227, EP-A-0 735 088, EP-A-0 810 258, WO00/05300 or WO00/05301.

The first (non-productive) phase is preferably carried out in several thermomechanical stages. During a first stage, the elastomers, the reinforcing fillers and the crumb (and optionally the coupling agents and/or other ingredients, with the exception of the crosslinking system) are introduced into an appropriate mixer, such as an ordinary internal mixer, at a temperature between 20° C. and 100° C. and preferably between 25° C. and 100° C. After a few minutes, preferably from 0.5 to 2 min, and a rise in the temperature to 90° C. to 100° C., the other ingredients (that is to say, those which remain if not all were put in at the start) are added all at once or portionwise, with the exception of the crosslinking system, during a compounding ranging from 20 seconds to a few minutes. The total duration of the kneading, in this non-productive phase, is preferably between 2 and 10 minutes at a temperature of less than or equal to 180° C. and preferentially of less than or equal to 170° C.

After cooling the mixture thus obtained, the crosslinking system is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or of a plaque, in particular for a laboratory characterization, or else extruded, in order to form, for example, a rubber profiled element used in the manufacture of semi-finished products for tyres. These products can subsequently be used in the manufacture of tyres, according to techniques known to a person skilled in the art, with the advantage of the invention, namely good tack of the layers on one another before curing of the tyre.

The crosslinking (or curing) is carried out in a known way at a temperature generally of between 130° C. and 200° C., under pressure, for a sufficient time which can vary, for example, between 5 and 90 min, as a function in particular of the curing temperature, of the crosslinking system adopted, of the kinetics of crosslinking of the composition under consideration or else of the size of the tyre.

The examples which follow illustrate the invention without, however, limiting it.

III—IMPLEMENTATIONAL EXAMPLES OF THE INVENTION

III-1 Characterization of the Crumb Rubbers and of the Rubber Compositions of the Examples In the examples, the crumb rubbers are characterized as indicated below.

Measurement of the Size of the Particles:

The size of the particles (in particular the D50) can be measured by a laser particle size analyser of the Mastersizer 3000 type from Malvern. The measurement is carried out by the liquid route, diluted in alcohol after an ultrasound pretreatment for 1 min in order to guarantee the dispersion of the particles. The measurement is carried out in accordance with Standard ISO-13320-1.

Measurement of the Acetone Extract:

The acetone extract content is measured according to Standard ISO1407 by means of an extractor of Soxhlet type.

A test sample (between 500 mg and 5 g) is introduced into an extraction chamber and then placed in the extractor tube of the Soxhlet. A volume of acetone equal to two or three times the volume of the extractor tube is placed in the collector of the Soxhlet. The Soxhlet is subsequently assembled and then heated for 16 h.

The sample is weighed after extraction. The acetone extract content corresponds to the loss in weight of the sample during the extraction, with respect to its initial weight.

Measurement of the Chloroform Extract:

The chloroform extract content is measured according to Standard ISO1407 by means of an extractor of Soxhlet type.

A test sample (between 500 mg and 5 g) is introduced into an extraction chamber and then placed in the extractor tube of the Soxhlet. A volume of chloroform equal to two or three times the volume of the extractor tube is placed in the collector of the Soxhlet. The Soxhlet is subsequently assembled and then heated for 16 h.

The sample is weighed after extraction. The chloroform extract content corresponds to the loss in weight of the sample during the extraction, with respect to its initial weight.

Measurement of the Average Molecular Weights of the Chloroform Extract:

The molecular weights are determined by size exclusion chromatography, according to a Moore calibration and according to Standard ISO16014.

The weight-average molecular weight (Mw) of the chloroform extract is measured by size exclusion chromatography (SEC) with a refractive index (RI) detector. The system is composed of an Alliance 2695 line from Waters, of a column oven from Waters and also of an RI 410 detector from Waters. The set of columns used is composed of two PL Gel Mixed D columns (300×7.5 mm 5 μm), followed by two PL Gel Mixed E columns (300×7.5 mm 3 μm) from Agilent. These columns are placed in a column oven thermostatically controlled at 35° C. The mobile phase used is non-antioxidized tetrahydrofuran. The flow rate of the mobile phase is 1 ml/min. The RI detector is also thermostatically controlled at 35° C.

The chloroform extract is dried under a nitrogen stream. The dry extract is subsequently taken up at 1 g/l in non-antioxidized tetrahydrofuran at 250 ppm with stirring for 2 hours. The solution obtained is filtered using a syringe and a single-use 0.45 μm PTFE syringe filter. 100 μl of the filtered solution are injected into the conditioned chromatographic system at 1 ml/min and 35° C.

The Mw results are provided by integration of the chromatographic peaks detected by the RI detector above a value of 2000 g/mol. The Mw is calculated from a calibration carried out using polystyrene standards.

Measurement of the Fraction by Weight of Carbon Black:

The fraction by weight of carbon black is measured by a thermogravimetric analysis (TGA) according to Standard NF T-46-07, on an appliance from Mettler Toledo, model "TGA/DSC1". Approximately 20 g of sample are introduced into the thermal analyser, then subjected to a thermal program from 25 to 600° C. under an inert atmosphere (pyrolysable phase) and then from 400 to 750° C. under an oxidizing atmosphere (oxidizable phase). The weight of the sample is continuously measured throughout the thermal programme. The black content corresponds to the loss of weight measured during the oxidizable phase, with respect to the initial weight of sample.

In the examples, the rubber compositions are characterized, before and/or after curing, as indicated below.

Measurement of the Elongation at Break at 23° C. and at 100° C.:

The measurement is carried out by tensile tests, which make it possible to determine the elasticity stresses and the properties at break. Unless otherwise indicated, they are carried out in accordance with French Standard NF T 46-002 of September 1988. All these tensile measurements are carried out under the standard conditions of temperature (23±2° C.) or at 100° C., if appropriate, and of hygrometry (50±10% relative humidity). The elongations at break (in %) are measured in particular.

The results are given in base 100 in order to make the results easier to read and understand; that is to say that the value 100 is arbitrarily assigned to the best control, in order to subsequently compare the values of the various solutions tested. In this way, a lower value represents a decrease in tear strength performance (that is to say, a decrease in the elongation at break), whereas a higher value represents a better performance.

Measurement of the Melt Flow Index:

This measurement is adapted from the measurement of melt flow index commonly used in the plastics industry for the characterization of the extrudability, in particular of thermoplastics. The measurement is described in Standard ASTM D1238 (or NF T 51-016) and modified as follows.

The sample of the elastomeric mixture is heated, in a capillary rheometer, to a regulated temperature (approximately 90° C.). The weight which has flowed (extrudate) through a cylindrical die (diameter 2 mm) made of tungsten carbide, using a loaded piston, is subsequently measured. The melt flow index value corresponds to the displacement of the piston under the effect of the load, in hundredths of a millimetre, for a time of 10 seconds (it corresponds to a flow rate). The index 100 is given for the melt flow index of the control composition; an index of greater than 100 indicates a greater melt flow index and a lower index indicates a poorer melt flow index.

III-2 Preparation of the Crumbs

For the implementational examples, the crumbs used result from the grinding of a heavy-duty vehicle tyre tread composition as presented in Table 1 below. The grinding is carried out on an item of equipment CUM150 from Netzsch using pin diameters of 3 mm and a rotational speed of the mill of 15 000 rpm. The material flow rate is of the order of 50 kg/h and the facility is cooled in order to guarantee a gas temperature at the outlet of the mill of −60° C.

TABLE 1

| Crumb composition | P1 | P2 |
| --- | --- | --- |
| NR (1) | 25 | 25 |
| BR (2) | 75 | 75 |
| Carbon black (3) in phr | 58 | 77 |
| Carbon black as % by weight | 35 | 35 |
| Plasticizer (4) in phr | 0 | 35 |
| Plasticizer (4) as % by weight | 0 | 16 |
| Antioxidant (5) | 1.5 | 1.5 |
| Stearic acid (6) | 2 | 2 |
| Zinc oxide (7) | 3 | 3 |
| Accelerator (8) | 1.5 | 1.5 |
| Sulfur | 1.5 | 1.5 |
| Acetone extract | 4.6% | 20.5% |
| Chloroform extract | 6.3% | 21.3% |
| Mw of the chloroform extract | 7000 g/mol | 7000 g/mol |

(1) NR: Natural rubber
(2) BR: polybutadiene, CB24 from Lanxess; 96% of cis-1,4; Tg = −107° C.
(3) Carbon black, ASTM N234 grade
(4) Plasticizer: Glycerol trioleate, sunflower oil comprising 85% by weight of oleic acid, Lubrirob Tod 1880 from Novance
(5) N-(1,3-Dimethylbutyl)-N'-phenyl-p-phenylenediamine (Santoflex 6-PPD) from Flexsys
(6) Stearin, Pristerene 4931 from Uniqema
(7) Zinc oxide, industrial grade - Umicore
(8) N-Cyclohexyl-2-benzothiazolesulfenamide (Santocure CBS from Flexsys)

III-3 Rubber Compositions

The compositions are manufactured with introduction of all of the constituents onto an internal mixer, with the exception of the vulcanization system. The vulcanization agents (sulfur and accelerator) are introduced onto an external mixer at low temperature (the constituent rollers of the mixer being at approximately 30° C.). The crumbs can be introduced into the internal or external mixer.

The object of the examples presented in Table 2 is to compare the different rubber properties of a control composition (C) with the properties of a composition in accordance with the invention (I). The properties are presented in Table 3.

TABLE 2

|  | C | I |
| --- | --- | --- |
| NR (1) | 80 | 80 |
| BR (2) | 20 | 20 |
| Carbon black (3) | 48 | 48 |
| Crumb P1 | 40 | 0 |
| Crumb P2 | 0 | 40 |
| Antioxidant (4) | 3 | 3 |
| Stearic acid (5) | 2 | 2 |
| Zinc oxide (6) | 3 | 3 |
| Accelerator (7) | 1 | 1 |
| Sulfur | 1.5 | 1.5 |

(1) NR: Natural rubber
(2) BR: polybutadiene, CB24 from Lanxess; 96% of cis-1,4; Tg = −107° C.
(3) Carbon black, ASTM N234 grade
(4) N-(1,3-Dimethylbutyl)-N'-phenyl-p-phenylenediamine (Santoflex 6-PPD) from Flexsys
(5) Stearin, Pristerene 4931 from Uniqema
(6) Zinc oxide, industrial grade - Umicore
(7) N-Cyclohexyl-2-benzothiazolesulfenamide (Santocure CBS from Flexsys)

TABLE 3

|  | C | I |
| --- | --- | --- |
| Melt flow index (base 100) | 100 | 150 |
| Elongation at break at 100° C. (base 100) | 100 | 114 |
| Elongation at break at 23° C. (base 100) | 100 | 107 |

In comparison with the control composition, it is noted that the composition I in accordance with the invention makes it possible to improve the melt flow index and the tear strength, as shown by the measurements of elongation at break at 23° C. and at 100° C.

The invention claimed is:

1. A rubber composition based on at least an elastomer, a reinforcing filler, a crosslinking system, and a crumb rubber,
wherein the crumb rubber exhibits an acetone extract of between 8% and 50% by weight and a chloroform extract such that a ratio of the chloroform extract to the acetone extract, expressed as percentage by weight, is less than 1.5 and greater than zero, the chloroform extract exhibiting a weight-average molecular weight Mw of less than 10,000 g/mol,
wherein the crumb rubber includes a content of plasticizer of greater than 8% by weight of the crumb rubber, and
wherein the crumb rubber is a ground or micronized rubber material that is not subject to chemical treatment and that has not been subject to chemical treatment.

2. The rubber composition according to claim 1, wherein the crumb rubber includes a content of plasticizer of greater than 12%, by weight, of the crumb rubber.

3. The rubber composition according to claim 1, wherein the plasticizer in the crumb rubber is selected from the group consisting of oils, hydrocarbon resins and mixtures thereof.

4. The rubber composition according to claim 1, wherein the plasticizer in the crumb rubber comprises a plasticizing oil selected from the group consisting of naphthenic oils, paraffinic oils, MES oils, TDAE oils, mineral oils, vegetable oils, ether plasticizers, ester plasticizers, phosphate plasticizers, sulfonate plasticizers and mixtures thereof.

5. The rubber composition according to claim 1, wherein the plasticizer in the crumb rubber comprises a plasticizing oil selected from the group consisting of naphthenic oils, paraffinic oils, MES oils, TDAE oils, vegetable oils and mixtures thereof.

6. The rubber composition according to claim 1, wherein the crumb rubber exhibits a mean particle size D50 of between 10 and 400 µm.

7. The rubber composition according to claim 1, wherein the crumb rubber is present at a content ranging from 5% to 40% by weight.

8. The rubber composition according to claim 1, wherein the crumb rubber is present at a content ranging from 5 to 100 phr.

9. The rubber composition according to claim 1, wherein the crumb rubber exhibits an acetone extract of between 8% and 30% by weight.

10. The rubber composition according to claim 1, wherein the crumb rubber exhibits a chloroform extract of between 10% and 30% by weight.

11. The rubber composition according to claim 1, wherein the crumb rubber exhibits a chloroform extract, the weight-average molecular weight of which is less than 8000 g/mol.

12. The rubber composition according to claim 1, wherein the elastomer predominantly comprises an elastomer selected from the group consisting of essentially unsaturated diene elastomers.

13. The rubber composition according to claim 12, wherein the predominant elastomer is selected from the group consisting of polybutadienes, polyisoprenes, butadiene copolymers, isoprene copolymers and mixtures thereof.

14. The rubber composition according to claim 13, wherein the predominant elastomer is selected from the group consisting of polybutadienes, polyisoprenes and mixtures thereof.

15. The rubber composition according to claim 1, wherein the reinforcing filler is selected from the group consisting of silicas, carbon blacks and mixtures thereof.

16. The rubber composition according to claim 1, wherein a content of reinforcing filler is within a range extending from 5 to 200 phr.

17. The rubber composition according to claim 1, wherein a predominant reinforcing filler is carbon black at a content within a range extending from 30 to 90 phr.

18. The rubber composition according to claim 1, wherein a predominant reinforcing filler is silica at a content within a range extending from 30 to 90 phr.

19. A tire comprising the rubber composition according to claim 1.

20. The tire according to claim 19, wherein the rubber composition constitutes all or part of a tread of the tire.

* * * * *